Sept. 17, 1940.  G. G. SIMON  2,214,823
IRREMOVABLE TAG AND METHOD OF ATTACHING IT
Filed Nov. 20, 1939
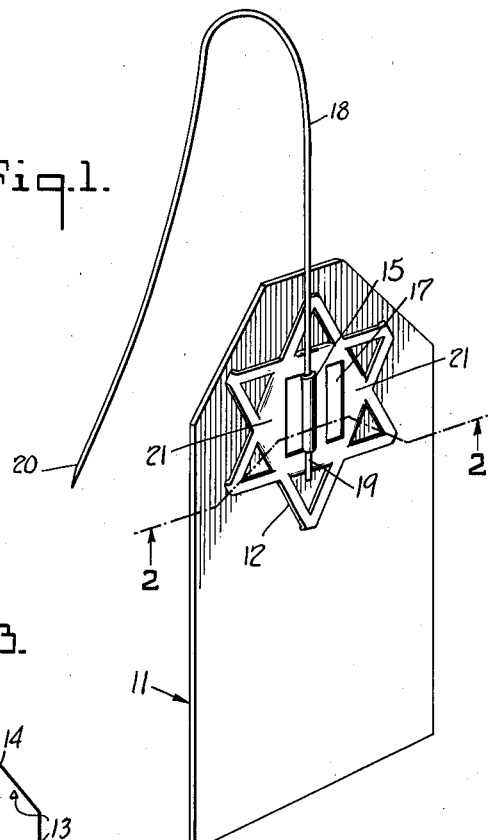
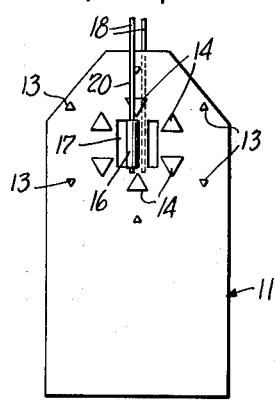
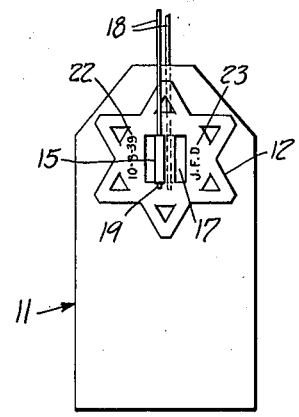
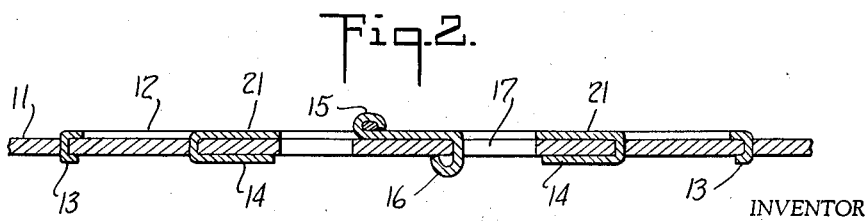
INVENTOR.
GUSTAVE G. SIMON
BY
Gluck & Breitenfeld
ATTORNEYS Patented Sept. 17, 1940

2,214,823

UNITED STATES PATENT OFFICE 2,214,823

IRREMOVABLE TAG AND METHOD OF ATTACHING IT

Gustave G. Simon, New York, N. Y.

Application November 20, 1939, Serial No. 305,220

3 Claims. (Cl. 40—21)

My present invention relates generally to tags, and has particular reference to a device intended to be irremovably associated with a meat carcass or the like.

Coordinately, my invention relates to a process for irremovably securing a certifying tag to a product, such as a meat carcass, in a novel manner.

While certain phases of my invention are not necessarily restricted to any particular use, the present device is primarily designed for attachment to meat carcasses, and for this reason I have chosen to illustrate my invention in the form of a device intended for such use.

In order that the features of my invention may be better understood, brief reference will be made to certain practices in the "kosher" meat industry. All meats of this character are slaughtered and handled in a prescribed manner, and a person of authority, appointed for the purpose, inspects the meat carcasses to determine whether the prescribed practices have been carried out; and if a carcass is found to qualify, this person certifies upon the article itself that it is "kosher." This is usually accomplished by piercing a wire through the carcass and irremovably securing its ends together, a tag being strung on the wire and bearing the desired certification.

There are numerous disadvantages to this customary procedure. For example, the wire and the sealing means are apt to cause injury to workmen handling the carcass; the tag may frequently be torn from the wire; and the sealing devices lend themselves too readily for illegitimate use, because certain inscriptions thereon are placed there by the manufacturer and not by the person who is certifying the meat carcass.

Generally speaking, these disadvantages, and others, may be attributed to the separate existence of the wire, the sealing means, and the tag.

My present invention is admirably adapted to overcome these difficulties, and to afford a simple means, not readily susceptible to abuse, for ear-marking or certifying products which meet certain qualifications.

Briefly, my invention consists of a unitary device in which a tag, a sealing means, and an attachment wire are irremovably associated with one another. By the term "irremovable," as used herein and in the appended claims, I intend to denote the fact that removal or separation cannot be effected except by irremediable mutilation.

An outstanding feature of my present invention lies in the provision of means whereby the authorized person inspecting the meat is enabled to affix an authentic certification automatically, at the time that the device is secured to the meat. More particularly, the attachment of the device to the meat in an irremovable manner involves the deformation or crimping of a deformable portion of the device. It is contemplated that a suitable implement such as a crimping tool will be used for this purpose; and my invention is of such a character that the use of this implement may be resorted to for the purpose of simultaneously affixing a permanent authentic certification.

I achieve the foregoing objects, and such other objects as may hereinafter appear or be pointed out, in the manner illustratively exemplified in the accompanying drawing, wherein—

Figure 1 is a perspective view of a device of the present character;

Figure 2 is an enlarged cross-sectional view taken substantially along the line 2—2 of Figure 1;

Figure 3 is an elevational view of the rear face of the device of Figure 1, after the device has been secured to a meat carcass or the like; and Figure 4 is a view similar to Figure 3 showing the front face of the device under the same circumstances.

To one face of a flat tag 11, of any desired suitable shape, and composed of any suitable material such as heavy paper or cardboard, I mount a metallic element 12. This element is in the form of a flat disk, preferably star-shaped as shown.

The element 12 is of relatively thin deformable metal, such as tin, and it is secured to the tag 11 by means of prongs which are integral with the element 12 and which are pierced through the tag 11. Where the element or disk 12 is star-shaped, as shown, there is a prong at each point of the star, and I have designated these prongs by the reference numerals 13 (see Figures 2 and 3).

Any number of additional prongs may also be provided for, and in the illustrated embodiment I have shown, by way of example, how six additional prongs 14 may be advantageously struck up from the material of the disk 12 and pierced through the tag 11.

It will be understood that these prongs are firmly crimped or compressed into the opposite face of the tag, so that the disk is firmly secured, in a flatwise manner, to the tag, with no projecting points or other sharp edges which might inadvertently cause injury to anyone handling the tag or the meat product itself.

One portion of the disk 12, struck up from the material of the disk, is shaped to define a tube 15 on the same side of the tag as that to which the disk 12 is attached, i. e., the forward side as viewed in Figures 1 and 4. Another portion of the disk 12, similarly struck up from the material of the disk, is caused to extend through the tag 11 to the opposite face thereof, and is similarly shaped to define a tube, this tube being designated by the reference numeral 16. To allow this assembly to be effected, the tag 11 is purposely provided with an opening 17 through which the portion 16 extends.

The tag is thus provided, on opposite faces thereof respectively, with a pair of deformable tubes 15 and 16. The axes of these tubes lie parallel to the plane of the tag 11, and are preferably, but not necessarily, parallel to each other as shown in the illustrated embodiment.

The assembly is completed by the provision of an attachment wire 18 which has one end irremovably crimped within one of these tubes. Merely by way of example, I have shown the end 19 of the wire 18 secured within the tube 15, it being understood that the wire is held in position, in an irremovable manner, by the crimping or other similar deformation of the tube 15 during the course of manufacture of the present device.

The end 19 of the wire 18 could, with equal effect, be initially secured in association with the tube 16. In any event, the free end 20 of the wire 18 is attenuated and is adapted to be pierced through the carcass to which the device is to be attached.

After the free end of the wire 18 is pierced through the meat carcass, it is inserted through the tube on the opposite face of the tag, and irremovably secured within such tube by a deformation of the latter. In the illustrated embodiment, the free end 20, after passing through the meat carcass, would be irremovably secured, in this manner, within the tube 16.

The deformation or crimping of the tube 16 is intended to be effected by a suitable implement (not shown) which will have two complementary jaws adapted to sandwich the present tag between them, whereby a squeezing action of the jaws toward each other will compress and suitably deform or crimp the tube 16. The jaws will have operative surfaces of sufficient area to engage between them not only all of the tube 16, but also one or both of the regions 21 adjacent to the tubes 15 and 16. These regions 21 are of appreciable area, whereby a predetermined deformation of one or both of these regions may be effected by the jaws, to compress certain indicia. By way of example, I have indicated an indicia 22 in Figure 4, in the form of a date, and I have indicated an indicia 23 in the form of certain initials. These are illustrative of the types of indicia that are intended to be compressed on one or both of the regions 21 during the crimping operation. Whatever indicia is desired, and it may well include the "kosher" symbols, if desired, is provided for by simply constructing the complementary jaws of the clamping instrument with suitable complementary elevated and depressed portions respectively.

It will be observed that the deformable disk 12 occupies only a portion of the area presented by the tag 11. The remaining area of the tag may be utilized to receive any other desired markings, such as the name of the meat packer, the name of the dealer, a descriptive designation of the meat itself, or the like. The important markings, however, so far as the certification of the meat product is concerned, are those which will appear as indicated at 22 and 23 in Figure 4; and it is important to observe that these markings are not capable of being affixed, except by the person who possesses and uses the crimping tool by means of which the device is irremovably attached to the meat carcass. This desirable mode of procedure is capable of achievement by virtue of the construction and mode of association of the various structural elements entering into the present device.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is:

1. In a device for irremovable association with a meat carcass, a flat tag having an opening therein, a flat disk of deformable metal secured flatwise to one face of the tag, said disk having a portion shaped to define a tube on said face of the tag, said disk having another portion extending through said opening and shaped to define a deformable tube on the opposite face of the tag, and an attachment wire having one end irremovably crimped within one of said tubes, the free end of the wire being adapted to be pierced through said carcass and to be irremovably secured within the other tube by deformation of the latter.

2. In a device for irremovable association with a meat carcass, a flat tag having an opening therein, a flat disk of deformable metal secured flatwise to one face of the tag, said disk having a portion shaped to define a tube on said face of the tag, said disk having another portion extending through said opening and shaped to define a deformable tube on the opposite face of the tag, and an attachment wire having one end irremovably crimped within one of said tubes, the free end of the wire being adapted to be pierced through said carcass and to be irremovably secured within the other tube by deformation of the latter, said disk presenting a region of appreciable area adjacent to the first-named tube, whereby a deformation of said region to impress certain indicia thereon may be effected simultaneously with the deformation of said tube.

3. In a device for irremovable association with a meat carcass, a flat tag, a flat disk of deformable metal secured flatwise to one face of the tag, said disk having a portion extending through the tag to the opposite face thereof, and an attachment wire having one end irremovably secured to the disk portion on one face of the tag, the free end of the wire being adapted to be pierced through said carcass and to be irremovably secured to the disk portion on the opposite face of the tag by deformation of the last-named disk portion, said disk being star-shaped and secured to the tag by prongs integral with the disk and pierced through the tag, there being a prong at each point of the star.

GUSTAVE G. SIMON.